Dec. 8, 1959 A. L. LEISER 2,916,132
APPARATUS FOR LOADING A CONVEYOR
Filed Sept. 12, 1955 3 Sheets-Sheet 1
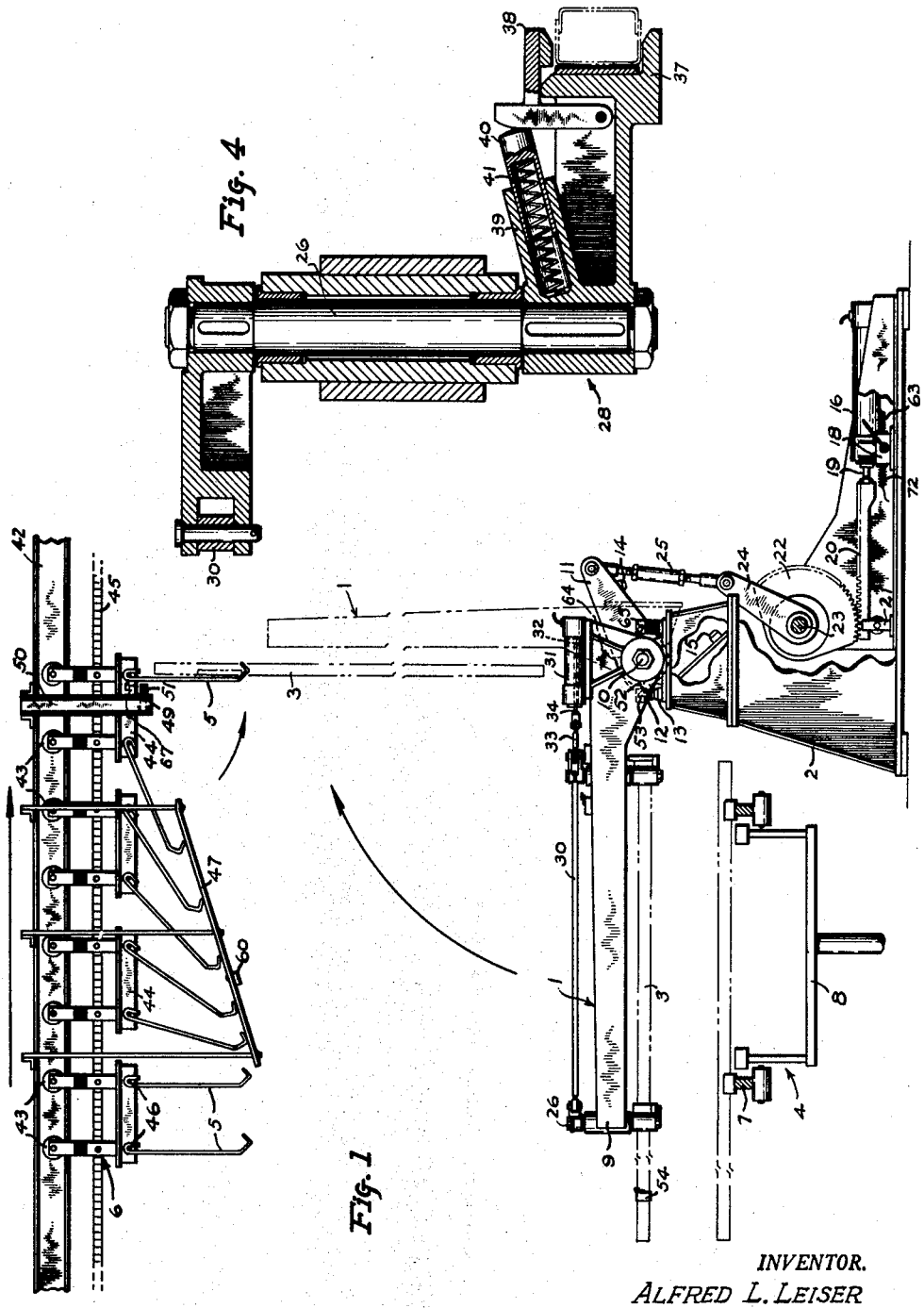
INVENTOR.
ALFRED L. LEISER
BY
Attorneys

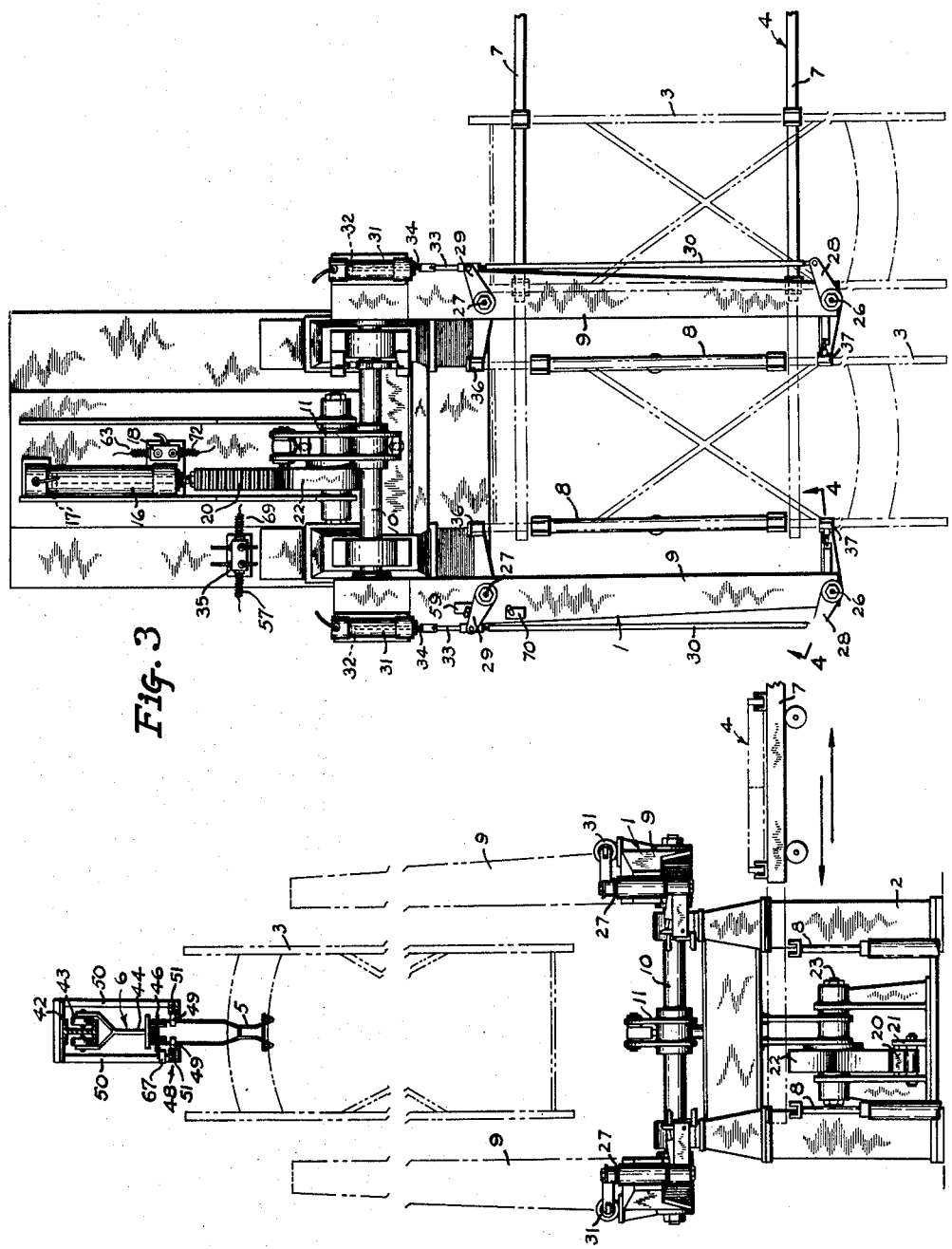

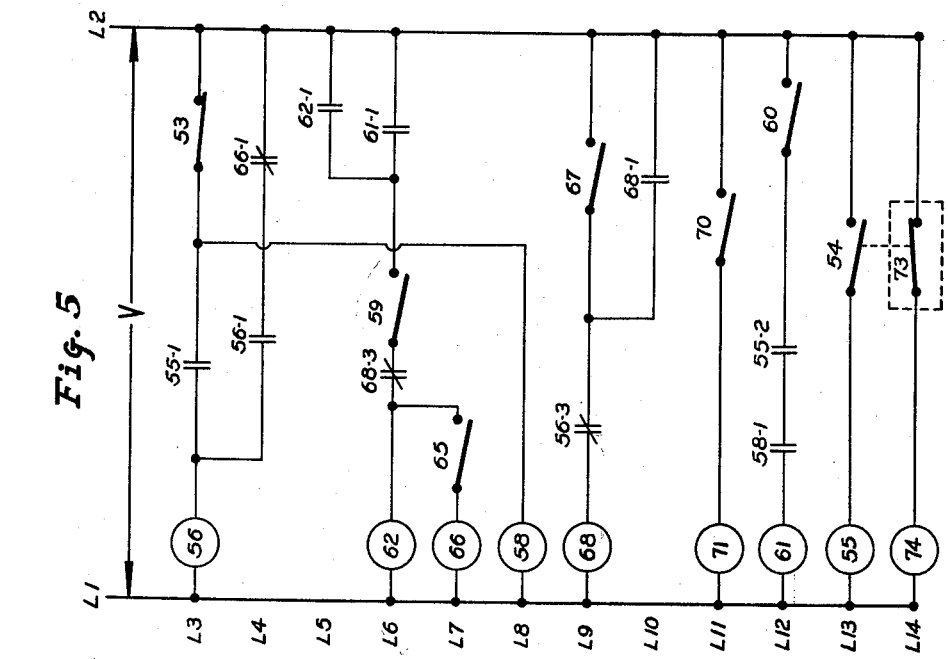

United States Patent Office 2,916,132
Patented Dec. 8, 1959

2,916,132

APPARATUS FOR LOADING A CONVEYOR

Alfred L. Leiser, Brookfield, Wis., assignor to A. O. Smith Corporation, Milwaukee, Wis., a corporation of New York Application September 12, 1955, Serial No. 533,671

11 Claims. (Cl. 198—21)

This invention relates to apparatus for transferring articles of manufacture received from one conveyor onto a second independently driven conveyor.

According to the invention, a transfer apparatus is disposed between a pair of independently driven conveyors to receive an article of manufacture from one of the conveyors and lift same for placement onto the other conveyor and is adapted to operate at varying time intervals corresponding to the operation of the respective conveyors as either conveyor is slowed down or stopped from time to time.

The invention is described herein as applied to a lifting apparatus for transferring assembled vehicle frames from an assembly line conveyor onto an independently driven hook conveyor for carrying the frames through a paint machine. The lifting apparatus comprises a boom pivotally mounted to a base and the boom is adapted to receive a frame from the assembly line conveyor while disposed in a horizontal position. Movable clamping means carried by the boom secure the frame to the boom when the clamping means are in the closed position and drive means are provided for pivoting the boom with respect to the base to move the boom from the horizontal position to a vertical position. To actuate the drive means, a switch member is carried by the boom and is adapted to be engaged by the clamping means upon closure of the clamping means to pivot the boom and carry the frame to a vertical position adjacent the hook conveyor for engagement by a conveyor hook. After the frame is engaged by the hook and removed from the boom, the hook engages a second switch member to reverse the drive means and return the boom to the horizontal position in readiness to receive the next frame from the assembly line.

The drawings furnished herewith illustrate the best mode of carrying out the invention as presently contemplated and set forth hereinafter.

In the drawings:

Figure 1 is a side elevation with parts broken away showing the frame transfer boom in the horizontal position for receiving a frame and in dot-dash lines showing the boom in the vertical position for placing the frame on the hook conveyor;

Fig. 2 is an end elevation of the frame transfer boom showing the same disposed between the asembly line conveyor and the hook conveyor;

Fig. 3 is a top elevation of the frame transfer boom showing the frame clamping mechanism;

Fig. 4 is a view taken on line 4—4 of Fig. 3,

Fig. 5 is a schematic circuit diagram of the electrical circuit which controls the operation of the frame transfer boom;

Fig. 6 is a schematic circuit diagram of the solenoid circuits energized by the control circuit to operate the boom and clamp actuating valves; and Fig. 7 is a schematic circuit diagram of the electrical interlock between the frame transfer boom and the assembly line.

Referring to the drawings, a boom 1 is pivotally mounted to a base structure 2 and is adapted to receive assembled vehicle frames 3 from an assembly line conveyor 4 while the boom is disposed in a horizontal position. Each frame 3 is clamped within the boom 1, and the boom is pivoted to a vertical position to raise the frame into position for engagement by a hook 5 of a hook conveyor 6 for transporting the frame through a paint machine, not shown. The boom 1 is adapted to operate at varying time intervals corresponding to the operation of both the assembly line conveyor 4 and the hook conveyor 6 as either conveyor is slowed down or stopped from time to time.

The assembly line conveyor 4 comprises a horizontally reciprocating transfer beam 7 for transporting the frames 3 between work stations and spaced vertically reciprocating lifter beams 8 for lifting the frames into the various assembly line work stations. Successive assembled frames 3 are received by the transfer beam 7 from the last previous work station, not shown, on the assembly line and moved horizontally to a location beneath and vertically aligned with the boom 1. During the momentary dwell of the transfer beam 7 at the end of its forward stroke, the lifter beam 8 is adapted to move upwardly to engage the frame 3 and lift the same from the transfer beam 7 to a position within the boom 1. After the frame 3 is lifted clear of the transfer beam 7, the transfer beam may return to its original position in readiness to receive the next succeeding frame.

The boom 1 receiving the assembled frames 3 from the assembly line conveyor 4 is comprised of a pair of generally parallel arms 9 which are spaced apart a distance somewhat greater than the width of a frame 3. One end of each of the spaced arms 9 is fixedly secured on shaft 10 which is pivotally carried by a base structure 2 supported from the floor of a suitable foundation.

The shaft 10 is adapted to be rotated to pivot the boom to a vertical position by means of a lever 11 fixedly secured to the shaft between the arms 9 and extending rearwardly from the shaft in a direction opposite from the arms.

To index the boom 1 in the horizontal position for receiving a frame 3 from the assembly line conveyor 4, lever 11 is provided with a projection 12 which extends forwardly of shaft 10 and engages the stop block 13 on the base structure 2. Rearwardly of shaft 10 the lever 11 is provided with a stop engaging surface 14 for engaging a second stop block 15 on the base structure 2 to index the boom 1 in the vertical position.

The drive for rotating shaft 10 to pivot the boom 1 includes a hydraulic cylinder 16 having a piston 17 slidably disposed therein. A two-way valve 18 applies the pressure alternately to either end of the cylinder 16 to drive the piston 17 within the cylinder. The piston rod 19 projects from the cylinder 16 and carries a rack 20 which is slidable between suitable guides 21 carried by the base structure 2. The rack 20 in turn drives gear segment 22 which is rotatably mounted on shaft 23. The shaft 23 is disposed parallel to shaft 10 and is fixedly carried by the base structure 2. A lever 24 is rotatably mounted on shaft 23 in vertical alignment with lever 11 on shaft 10 and is keyed on shaft 23 for rotation therewith. The rotation of lever 24 is transmitted to lever 11 to rotate shaft 10 and thereby pivot the boom 1 by means of the connecting link 25 which pivotally joins the respective levers. Thus, as the rack 20 is moved forwardly by the pressure behind piston 17, shaft 10 is rotated to pivot the boom 1 to a vertical position. And when the pressure within cylinder 16 is applied ahead of piston 17 the rack 20 moves rearwardly to rotate shaft 10 in the opposite direction to return the boom 1 to its horizontal position.

To secure the assembled frames 3 between the spaced arms 9 of the boom 1, a hydraulically actuated clamping mechanism is carried by the boom. Each arm 9 carries a rotatable shaft 26 adjacent the outer end thereof. A second rotatable shaft 27 is carried adjacent the opposite end of each arm 9. Bellcranks 28 and 29 are respectively fulcrumed on the respective shafts 26 and 27 and have one lever arm extending inwardly of the arms 9 and the other lever arm extending outwardly of arms 9. The outwardly extending lever arms of bellcranks 28 and 29 are pivotally connected to the rod 30. As the rod 30 is reciprocated, the bellcranks 28 and 29 pivot about their fulcrum shafts 26 and 27 simultaneously.

A cylinder 31 provided with a double acting piston 32 is carried by each arm 9 to actuate the rod 30. A link 33 pivotally connects the rod 30 and the piston rod 34 to accommodate the radial movement of rod 30 about the fulcrum shafts 26 and 27. A two-way valve 35 controls the pressure to the respective faces of piston 32.

The inwardly extending lever arms of bellcranks 29 are each provided with a saddle 36 which when pivoted to their innermost position receive the ends of frame 3 with the frame engaging the bottom of the saddles. The inwardly extending lever arms of bellcranks 28 each carry a bifurcated or channel-shaped jaw 37 which is adapted to loosely receive the side rails of frame 3 when the jaws are pivoted to their innermost position. Thus, as pressure is applied ahead of pistons 32 within cylinders 31 pulling rods 30 rearwardly the bellcranks 28 and 29 are pivoted to carry the saddles 36 and jaws 37 into the frame clamping position. Pressure applied behind the piston 32 pivots the saddles 36 and jaws 37 to a position clear of the frame 3.

The upper flange 38 of each jaw 37 is hinged to the respective bellcranks 28 to pivot outwardly with respect to the jaw. A tubular member 39 is secured to each bellcrank 28 and carries a plunger 40 which normally biases the flange 38 to its closed position for clamping the frame 3. A spring 41 disposed within member 39 behind the plunger 40 provides the holding pressure for keeping the jaw 37 closed to receive and support the frame side rails.

After a frame 3 is clamped within the boom 1, the boom is pivoted to a vertical position so that a hook 5 of the hook conveyor 6 may engage the frame and carry same to the paint machine, not shown. Upon engagement of the frame 3 by hook 5, the clamping mechanism is actuated to release the frame within the boom 1 so that the frame may be moved by the conveyor 6 clear of the boom. In the event the clamping mechanism fails to release the frame 3 or is slow in its releasing action, the hook 5 engages the frame and continues its travel pulling the frame against the flange 38 of jaw 37 to depress the spring biased plunger 40 to thereby release the frame. The end of the frame 3 is merely lifted out of the saddles 36 as the frame is pulled out of the hinged jaws 37. In this manner damage to the clamping mechanism may be prevented if the jaws 37 and saddles 36 do not pivot clear of the frame in the normal manner of operation.

The hook conveyor 6 travels on track 42 above the boom 1 and receives the frames 3 from the boom and carries the frames through the paint machine, not shown. At the location of boom 1 the center line of track 42 is substantially in the vertical plane through the center line of the boom. The conveyor 6 includes a plurality of rollers 43 which move longitudinally of the track 42. Rollers 43 carry a plurality of carriages 44 in longitudinally spaced relation with respect to the track and beneath the track. A driven chain 45 interconnects carriages 44 and extends continuously and longitudinally of the track 42. Drive means, not shown, engages the driven chain 45 to move the carriages and hooks on the track 42.

Each carriage 44 is provided with longitudinally spaced and laterally extending fixed pins 46 for pivotally supporting the hooks 5. The upper end of each hook 5 is bifurcated to hang from pin 46 on each side of the carriage 44.

Generally, the hook conveyor 6 will travel at a constant speed and ordinarily at a rate faster than the assembly line conveyor 4 so that a number of hooks 5 will pass the boom 1 without receiving a frame 3. Because of this variance in speed and because of the close spacing of hooks 5, interference may result between the hooks and the frame 3 being carried by the boom 1. To prevent interference between the hooks 5 and the frame 3 being lifted by the boom, an inclined plate 47 is suspended from the track 42 to guide the hooks above the path of the frame being lifted. The upper edge of plate 47 is adjusted to permit each hook 5 to drop in time to engage a cross member of the frame 3 in the upright position.

After dropping from the inclined plate 47 the hook 5 would normally tend to oscillate about pin 46 supporting the hook to the carriage 44. To prevent oscillation of the hooks 5, a latch mechanism 48 is employed which is supported from the track 42 above the path of the frame being lifted by the boom 1. The latch mechanism comprises a pair of laterally spaced arms 49 which extend longitudinally of the hook conveyor 6 and are pivotally mounted to the supports 50 extending downwardly from track 42. As the hooks 5 drop from plate 47 they swing between the pivoted ends of arms 49 where the lateral spacing between the arms is wide enough to receive the hook. The lateral spacing between arms 49 decreases as the hook 5 swings past the pivoted ends of the arm so that the swinging hook must move the arms laterally outwardly to move through the latch mechanism 48. As the free end of arms 49 are moved laterally outwardly by the hook 5 passing therebetween springs 51 disposed between each arm and its support 50 are depressed to permit passage of the swinging hook. After the hook 5 has passed through the arms 49, the springs 51 force the arms laterally inwardly and the free ends of the arms are disposed in the path of the return swing of the hook so that further oscillation by the hook is substantially prevented. The stabilized hook is then carried by the conveyor 6 to the frame engaging position where a frame may or may not be waiting for loading onto the conveyor.

The operation of boom 1 for lifting frames 3 from the assembly line conveyor 4 to the hook conveyor 6 is controlled by a series of switches, as shown in Fig. 5. The switches are sequentially closed by succeeding operations of the boom 1 as will be described hereinafter in connection with Figs. 5, 6 and 7.

In Figs. 5, 6 and 7 the power lines are connected to sources of power, not shown, and are designated by an L series of numbers as are the horizontal branch lines which are numbered consecutively from top to bottom. All contacts actuated by a given relay are designated by the reference numeral of the relay and a hyphenated consecutive number.

To begin the sequence of operation, the boom 1 will be assumed to be in the horizontal position ready to receive a frame 3 from the assembly line conveyor 4. In this position of the boom, a cam projection 52 on the boom pivot shaft 10 engages and holds closed the switch 53 located on the base structure 2. The switch 53 is shown closed in line L3. As the lifter beam 8 of the assembly line conveyor 4 lifts a frame 3 into the boom clamping position, the frame engages and closes switch 54 mounted to the foundation. Switch 54 is shown normally open in line L13. Upon closure of switch 54 by a frame 3, the contact relay 55 is energized to close contacts 55–1 in line L3 and 55–2 in line L12. Closure of contact 55–1 establishes a closed circuit in line L3 to energize relay 56 and close contact 56–1 in line L4 to lock in relay 56. Relay 56 simultaneously closes contacts 56–2 in line L17 of Fig. 6 which receives power from a source, not shown, through lines L15 and L16 to energize the solenoid 57 to set the two-way valve 35 so that pressure from a source, not shown, enters the cylinders 30 ahead of pistons 32 to actuate the clamping mechanism to engage and secure the frame 3 within the boom.

With the boom 1 remaining in the horizontal position the circuit through line L3 remains closed and relay 58 in line L8 is energized to close contacts 58–1 in line L12.

Upon closure of the clamping mechanism, the bellcrank 29 pivots with respect to the boom 1 and engages and closes switch 59 mounted on the boom. Switch 59 is disposed in line L6 and when closed the circuit through line L6 is set so that one further event will close the circuit.

Switch 60 shown in Line L12 is mounted on the inclined plate 47 for actuation by hooks 5 of the hook conveyor 6. With the boom 1 remaining in the horizontal position contacts 58–1 and 55–2 remain closed so that a momentary closure of switch 60 by a hook 5 completes the circuit through line L12 to energize relay 61. Relay 61 will close contacts 61–1 in line L6. If the frame 3 is clamped within the boom 1 so that switch 59 is closed, closure of contacts 61–1 completes the circuit through line L6 to energize the relay 62. Relay 62 will close the contacts 62–1 in line L5 to lock the relay 62 in the circuit. Simultaneously relay 62 closes contacts 62–2 in line L18 of Fig. 6 to energize the solenoid 63 to set the valve 18 so that pressure from a source, not shown, enters the cylinder 16 behind the piston 17 to drive the rack 20 forwardly to pivot the boom 1 with frame 3 clamped therein to a vertical position.

With the boom 1 raised to the vertical position switches 53 and 54 both open breaking the circuits through lines L3 and L13. Thus, if the next succeeding frame 3 is carried into the clamping position by lifter beams 8 to close switch 54, clamping is not initiated because switch 53 will remain open until the boom 1 returns to the horizontal clamping position.

A second cam projection 64 secured on the boom pivot shaft 10 engages and closes switch 65 located on the base structure 2 when the boom 1 reaches the vertical position. Switch 65 is disposed in line L7 and upon closure energizes relay 66 to open the normally closed contacts 66–1 in line L4 and breaks the clamping lock-in circuit through relay 56. The de-energization of relay 56 causes contacts 56–3 in line L9 to re-close. The contacts 56–3 are normally closed except while relay 56 is energized.

After the frame 3 has reached the vertical position it is ready to be received by a hook 5 of the hook conveyor 6 and to be unclamped from the boom. A switch 67 is supported from track 42 for engagement by the hook support pin 46 as the hook moves into position to receive the cross member of the frame 3. After contacts 56–3 in line L9 are re-closed, the hook 5 moving into the frame engaging position momentarily closes switch 67 in line L9 to close the circuit through line L9 and energize the relay 68 to close contacts 68–1 in line L10 to lock in relay 68. Simultaneously relay 68 closes the contacts 68–2 in line L19 of Fig. 6 to energize the solenoid 69 to set the two-way valve 35 so that pressure from a source, not shown, enters cylinders 31 behind the pistons 32 to actuate the clamping mechanism to disengage the frame 3 from the boom. If this action is sluggish or otherwise delayed, the hook 5 moving at substantially constant speed pulls the frame from the clamping mechanism by unseating the hinged member 38 of clamp jaws 37 against the pressure of spring 41. At this time the boom 1 is empty and is ready to be returned to the horizontal position to receive the next succeeding frame 3.

The energization of relay 68 in line L9 will also open the normally closed contacts 68–3 in line L6 to break the lock-in circuit for relay 62.

Upon opening the clamping mechanism, bell crank 29 pivots with respect to boom 1 and engages and closes switch 70 mounted on the boom. Switch 70 is disposed in line L11 and, upon closure, energizes relay 71 to close contacts 71–1 in line L20 of Fig. 6 to energize solenoid 72 to set the valve 18 so that pressure from a source, not shown, enters the cylinder 16 ahead of the piston 17 to drive rack 20 rearwardly and pivot the boom 1 to the horizontal position for receiving the next succeeding frame from the assembly line conveyor 4. Upon reaching the horizontal position switch 53 in line L3 is again closed by cam projection 52 on the boom pivot shaft 10 so that the boom cycle may be repeated.

The boom cycle is of necessity tied in with the assembly line conveyor 4 so that if there is a failure somewhere in the boom cycle and a frame 3 is already in the boom clamping position, an additional frame 3 will not be delivered there to cause a pile up.

To interlock the boom 1 and the assembly line conveyor 4, switch 54 is provided with a second set of switch contacts 73 disposed in line L14. With the boom clamping position open and ready to receive a frame 3 from the assembly line conveyor 4, switch 54 will be open and contacts 73 closed, as shown in Fig. 5, to energize relay 74 in line L14 to close contacts 74–1 in line L24 of Fig. 7. If a frame 3 is delivered to the clamping position switch 54 is held closed and contacts 73 will be open to de-energize relay 74 and open contacts 74–1 in line L24 of Fig. 7.

Referring now to Fig. 7, the circuit diagram illustrated shows the interlock circuit between the boom 1 and the assembly line conveyor 4. Power is received from a source, not shown, through lines L21 and L22. The assembly line conveyor timing cycle shaft 75, which is driven from the main assembly line conveyor drive, not shown, is provided with a cam projection 76 for engaging the switch 77 in line L26. The switch 77 is disposed in parallel with contacts 74–1 in line L24. The switch 77 and contacts 74–1 are both in series with solenoids 78 and 79 which are disposed in parallel and if energized respectively engage the clutch, not shown, and release the brake, not shown, for the assembly line conveyor drive, not shown.

If contacts 74–1 in line L24 are closed indicating that switch 54 in line L13 of Fig. 5 is open and the boom clamping position is ready to receive a frame 3 for clamping, relay 80, disposed in a portion of line L26 connected in series with Line L24 by bridging line L29, is energized to close contact 80–1 in line L24 completing a circuit through the solenoids 78 and 79 so that the solenoids are energized to respectively engage the clutch and release the brake so that the drive for the assembly line conveyor may start the next cycle and deliver a frame to the clamping position. After the assembly line conveyor cycle has begun, the cam 76 on cycle shaft 75 turns away from the switch 77 to close across the contacts in line L26 completing the circuit through line L26. Thus relay 80 continues to be energized to hold contacts 80–1 in line L24 closed to complete the circuit through switch 77, bridging line L29, and the respective solenoids 78 and 79 to keep the solenoids energized during a full revolution of the timing cycle shaft 75. At the end of one revolution of the assembly line conveyor timing cycle shaft 75, cam 76 lifts switch 77 to break the circuit through line L26. However, if the boom clamping position is in readiness to receive another frame 3, contacts 74–1 will be closed so that relay 80 will continue to be energized to maintain contacts 80–1 and solenoids 78 and 79 in running position to begin the succeeding assembly line conveyor cycle immediately.

If for any reason the frame 3 is not removed from the boom clamping position during the full revolution of the timing cycle shaft 75, contacts 74–1 will be open when the cycle shaft lifts switch 77 to break the circuit through line L26. With contacts 74–1 open and the circuit through line L26 broken, relay 80 in line L26 will be de-energized to open contacts 80–1 in line L24 to effect a de-energization of solenoids 78 and 79 to set the assembly line conveyor brake and release the clutch. The de-energization of relay 80 will further close contacts 80–2 in line L27. Further, cam 76 will lift switch 77 to a position as shown by dotted lines in Fig. 7 to close the circuit through the switch and line L25 energizing the timer relay 81. The timer relay 81 may be set for any predetermined period of time; for example, ten seconds. If the delay in boom operation is overcome and the boom 1 removes the frame 3 from the clamping position within the ten second period of the timer relay, contacts 74–1 will be re-closed to energize relay 80 and close contacts 80–1 to reenergize solenoids 78 and 79 and again release the brake and engage the clutch so that a new assembly line conveyor cycle can be started. Simultaneously with the closing of contacts 74–1, the energization of relay 74 in line L14 of Fig. 5 effects opening of contacts 74–2 in line L25 to de-energize the timer relay 81 so that the assembly line conveyor may return to normal operation as governed by the timing cycle shaft 75.

If, however, frame 3 is still not removed during the period of the timer relay 81, then at the end of the period the timer relay effects closing of contacts 81–1 in line L27 to complete the circuit through line L27 to energize relay 82. The energization of relay 82 effects closing of contacts 82–1 in line L28 to lock in relay 82. Simultaneously relay 82 opens contacts 82–2 to break the timer relay circuit in line L25 and opens contacts 82–3 in line L24 to keep the solenoids 78 and 79 de-energized so that the assembly line conveyor drive brake remains set and the clutch released. Thus, the energization and locking in of relay 82 breaks the circuits controlling the drive for the assembly line conveyor to bring the conveyor to a complete standstill so that it may be determined why the boom 1 is not operating properly and to correct the difficulty.

After the boom difficulty has been cleared, the assembly line conveyor drive may again be actuated by operating the master switch 83 in line L23 disposed in parallel with contacts 74–1 and switch 77 and in series with the brake and clutch solenoids 78 and 79. A reset 84 in line L27 is coupled with master switch 83 so that the lock-in circuit for relay 82 is broken to de-energize relay 82 to close contacts 82–2 in the timer relay circuit and 82–3 in the solenoid circuits.

Various modes of carrying out the invention are contemplated as being within the scope of the following claims particularly pointing out and distinctly claiming the subject matter which is regarded as the invention.

I claim:

1. An apparatus for lifting a vehicle frame from one conveyor operating on a variable time cycle to a hook conveyor operating at substantially constant speed and at a higher level, comprising a base, a boom pivoted to the base and adapted to receive a vehicle frame from the first conveyor while in the horizontal position, drive means to pivot the boom with respect to the base from the horizontal position to a vertical position, clamping means carried by the boom for securing the article to the boom when the clamping means are in the closed position, means responsive to the boom being in the horizontal position and responsive to the frame entering the clamping position for closing said clamping means to clamp the frame, and actuating means carried by the boom and engageable by the clamping means upon closing of the same to set thet drive means in motion to pivot the boom and carry the frame to a vertical position adjacent the hook conveyor for engagement by a conveyor hook.

2. An apparatus for lifting a vehicle frame from one conveyor operating on a variable time cycle to a hook conveyor operating at substantially constant speed and at a higher level, comprising a base, a pair of spaced arms pivoted to the base and adapted to receive a frame therebetween from the first conveyor while the arms are disposed in a horizontal position, drive means to pivot the arms with respect to the base, frame clamping means carried by the spaced arms for securing the frame within the arms when the clamping means are in the closed position, second drive means for moving the clamping means to the closed position, switch means engaged by the frame upon entering the clamping position to actuate the clamp drive means to close the clamping means to secure the frame, and second switch means carried by one of said arms and engaged by the clamping means upon closure of the clamping means to set the first named drive means in motion to pivot the arms and carry the frame to a position adjacent the hook conveyor for engagement by a conveyor hook.

3. An apparatus for lifting a vehicle frame from one conveyor operating on a variable time cycle to a hook conveyor operating at substantially constant speed and at a higher level, comprising a base, a pair of spaced arms pivoted to the base and adapted to receive a frame therebetween from the first conveyor while the arms are disposed in a horizontal position, drive means to pivot the arms with respect to the base from the horizontal position to a vertical position, clamping means carried by the arms for securing the frame within the arms when the clamping means are in the closed position, second drive means for selectively opening and closing the clamping means, means responsive to the arms being in the horizontal position and to the frame entering the clamping position for actuating the second drive means to close said clamping means and clamp the frame between the arms, means responsive to the closure of the clamping means an dto the operation of the hook conveyor to actuate the first named drive means to pivot the arms and carry the frame to a vertical position adjacent the hook conveyor for engagement by a conveyor hook, means responsive to the arms being in the vertical position and to a conveyor hook entering the frame engagement for actuating the second drive means to open said clamping means and unclamp the frame between the arms and, drop the same onto the conveyor hook for transport by the hook conveyor, and means responsive to unclamping the frame to set the first named drive means in motion to return the pivotable arms to the horizontal position to receive the next succeeding vehicle frame from the first conveyor.

4. An apparatus for lifting a vehicle frame and placing same on a continuously operating hook conveyor, comprising a base, a boom pivoted to the base and comprised of spaced arms adapted to receive a frame therebetween while in the horizontal position, drive means connected to the base for pivoting the boom with respect to the base from the horizontal position to a vertical position, clamping means provided on the boom arms and comprising a pivotable saddle member and a pivotable jaw carried by each of the boom arms in aligned relation to respectively receive the ends of the vehicle frame and the sides of the frame, means responsive to the boom being in the horizontal position and to the frame entering the clamping position to pivot the saddle members and jaws to the closed position for clamping the frame to the boom, and actuating means carried by the boom arms and engageable by the clamping means upon closure of the same to set the drive means in motion to pivot the boom and carry the clamped vehicle frame to a vertical position adjacent the hook conveyor for engagement by a conveyor hook.

5. An apparatus for lifting a vehicle frame and placing same on a continuously operating hook conveyor traveling in a given direction, comprising a base, a boom pivoted to the base and extending therefrom when in a horizontal position in a direction opposing the travel of the hook conveyor and comprising a pair of spaced arms adapted to receive a frame therebetween while in the horizontal position, drive means to pivot the boom with respect to the base from the horizontal position to a vertical position, a pivotable saddle member carried by each arm in aligned relation adjacent to the end of the boom pivoted to the base and adapted to receive the ends of the vehicle frame when the members are pivoted to their extended position, a channel shaped pivotable jaw carried by each arm in aligned relation adjacent the opposite end of the boom and adapted to receive the side members of the vehicle frame therein when the jaws are pivoted to their extended position, the saddle member on each arm being interconnected with the corresponding jaw on said arm to pivot simultaneously and thereby clamp the vehicle frame to the boom, means responsive to the boom being in the horizontal position and to a vehicle frame entering the clamping position to pivot the saddle members and jaws to their extended position to clamp the frame, and means responsive to pivoting the saddle members and jaws to their extended position to set the drive means in motion to pivot the boom and carry the clamped vehicle frame to the vertical position adjacent to the hook conveyor for engagement by a conveyor hook.

6. In an apparatus for handling a vehicle frame, a base, a boom pivoted to the base and adapted to move from a horizontal position to a vertical position, clamping means carried by the boom for securing a vehicle frame to the boom, lift means disposed beneath the boom for raising a vehicle frame into the boom clamping position, means responsive to the boom being disposed in a horizontal position and to a vehicle frame entering the clamping position to actuate the clamping means to clamp the frame, a hook conveyor disposed above the boom and having a plurality of downwardly extending hooks and being adapted to move along a path in the vertcial plane extending through the center line of the boom, means responsive to the clamping of the frame to the boom to pivot the boom with the clamped frame to the vertical position adjacent the hook conveyor for engagement by a conveyor hook, said boom carrying the clamped frame to the vertical position moving through the path of the downwardly extending hooks, deflecting means associated with the hook conveyor to deflect the hooks approaching the frame engagement position and thereby preventing interference between the conveyor hooks and the frame carried by the boom with the hook dropping from said deflecting means into the frame engagement position and with said hook tending to oscillate in such position, and retarding means associated with the hook conveyor and disposed between said deflecting means and the frame engagement position to stabilize the hook and substantially prevent oscillation by the hook when entering the frame engagement position.

7. In an apparatus for handling a vehicle frame, a pivotable boom adapted to receive a vehicle frame and move from a horizontal position to a vertical position, a hook conveyor disposed above the boom and having a plurality of downwardly extending hooks and being adapted to move on a path in the vertical plane extending through the center line of the boom to receive a vehicle frame from the boom, and pivotable clamping means carried by the boom for securing a vehicle frame to the boom and including a channel shaped jaw having a spring biased hinged flange, said jaw normally pivoting to a retractable position to unclamp the frame from the boom for placement on a conveyor hook, said hinged flange being depressed by the frame against the spring pressure to release the frame from the jaw when the frame is engaged by the conveyor hook and pivotable retraction of the jaw is delayed.

8. In an apparatus for handling a vehicle frame, a pivotable boom adapted to receive a vehicle frame when said boom is in a horizontal position and transport the frame to a vertical position, lifter means driven independently of said boom and disposed beneath the boom and being adapted to receive successive vehicle frames for delivery to the boom, an independently driven hook conveyor disposed above the boom and adapted to travel in a path in the vertical plane extending through the center line of the boom to receive a vehicle frame from the boom, and means responsive to continued operation of the hook conveyor and to continued operation of the boom to actuate the lifter means.

9. The construction of claim 8 wherein the lifter means operates on a given time cycle within which the boom normally returns to a horizontal position to receive the next succeeding frame, and cycle timing means to stop the lifter means at the end of a cycle of operation, timing means responsive to the completion of said cycle and adapted to lock the lifter means in stop position after a predetermined period, and means responsive to the lowering of the boom to reset the timing means and start the next cycle of the lifter means.

10. In an apparatus for handling an article of manufacture, a pivotable boom adapted to receive an article for transport, conveyor means adapted to receive the article from the boom, and pivotable clamping means carried by the boom for securing the article to the boom and comprising a channel shaped jaw having a spring biased hinged flange, said jaw normally pivoting to a retractable position to unclamp the article from the boom for placement on the conveyor means, said hinged flange being depressed by the article against the spring pressure to release the article from the jaw when the article is received by the conveyor means and pivotable retraction of the jaw is delayed.

11. Apparatus for receiving an article and placing same on a continuously operating conveyor, comprising a base, a boom pivoted to the base and comprised of spaced arms adapted to receive the article therebetween while in the horizontal position, drive means connected to the base for pivoting the boom with respect to the base to transport the article, clamping means provided on the boom arms and comprising a pivotable saddle member and a pivotable jaw carried by each of the boom arms in aligned relation to receive the article, means responsive to the boom being in the horizontal position and to the article entering the clamping position to pivot the saddle members and jaws to the closed position for securing the article to the boom, and actuating means carried by the boom arms and engageable by the clamping means upon closure of same to set the boom drive means in motion to pivot the boom and carry the article to the position for placement of the article on the continuously operating conveyor.

References Cited in the file of this patent

UNITED STATES PATENTS

| | | |
|---|---|---|
| 1,895,046 | Morgan | Jan. 24, 1933 |
| 2,146,616 | Bishop | Feb. 7, 1939 |
| 2,665,013 | Socke | Jan. 5, 1954 |
| 2,718,320 | Nelson | Sept. 20, 1955 |
| 2,769,519 | Hauck | Nov. 6, 1956 |